(12) United States Patent
Martoch et al.

(10) Patent No.: US 10,598,842 B2
(45) Date of Patent: Mar. 24, 2020

(54) LIGHT DEVICE WITH A ROD-LIKE LIGHT GUIDE FOR A MOTOR VEHICLE

(71) Applicant: Varroc Lighting Systems, s.r.o., Senov u Noveho Jicina (CZ)

(72) Inventors: Jan Martoch, Hranice (CZ); Marek Rakovcik, Ostrava (CZ)

(73) Assignee: Varroc Lighting Systems S.R.O., Senov U Hoveho (CZ)

( * ) Notice: Subject to any disclaimer, the term of this patent is extended or adjusted under 35 U.S.C. 154(b) by 0 days.

(21) Appl. No.: 16/356,835

(22) Filed: Mar. 18, 2019

(65) Prior Publication Data
US 2019/0293857 A1    Sep. 26, 2019

(30) Foreign Application Priority Data

Mar. 23, 2018    (CZ) .............................. PV 2018-147

(51) Int. Cl.
| | |
|---|---|
| *F21V 8/00* | (2006.01) |
| *F21S 43/14* | (2018.01) |
| *F21S 43/237* | (2018.01) |
| *F21S 43/245* | (2018.01) |
| *F21S 43/249* | (2018.01) |

(Continued)

(52) U.S. Cl.
CPC ......... *G02B 6/0018* (2013.01); *B60Q 1/0029* (2013.01); *B60Q 1/2607* (2013.01); *F21S 43/14* (2018.01); *F21S 43/237* (2018.01); *F21S 43/245* (2018.01); *F21S 43/249* (2018.01);

(Continued)

(58) Field of Classification Search
CPC ........ F21S 43/14; F21S 43/237; F21S 43/245; F21S 43/249; F21S 43/30
See application file for complete search history.

(56) References Cited

U.S. PATENT DOCUMENTS

| | | | |
|---|---|---|---|
| 6,966,675 | B2 | 11/2005 | Albou |
| 2001/0026457 | A1 | 10/2001 | Oyama et al. |

(Continued)

FOREIGN PATENT DOCUMENTS

| | | |
|---|---|---|
| DE | 10207694 A1 | 11/2003 |
| DE | 102013104176 A1 | 10/2014 |
| WO | 2012052946 A1 | 4/2012 |

*Primary Examiner* — Joseph L Williams
(74) *Attorney, Agent, or Firm* — Hovey Williams LLP

(57) ABSTRACT

A light device for a motor vehicle is provided that contains a rod-like light guide (1) having a longitudinal axis (15) connecting two ends of the light guide (1), and a primary light source (2) at least one of the ends of the light guide (1) for emitting primary light rays (10) in the light guide (1). The light guide (1) comprises a front output surface (4) for the output of the primary light rays (10) and at a rear side (12) of the light guide (1) unbinding elements (6) to direct the primary light rays (10) propagating along the light guide (1) to the output surface (4). The light device further comprises at least one reflector unit (7) that contains a secondary light source (8) for emitting secondary light rays (11) and a reflector (9) adapted to reflect and direct the secondary light rays (11) in the form of a light stream (14) to the light guide (1), wherein in the lateral cross-section the light stream (14) has a shape of a band (13) having a longitudinal axis (3) being substantially parallel to the longitudinal axis (15) of the light guide (1), and the rear side (12) of the light guide (1) comprises a binding area (5) including binding surfaces (5 a) configured to bind the secondary light rays (11) to the light guide (1).

14 Claims, 8 Drawing Sheets

Figure 1A:
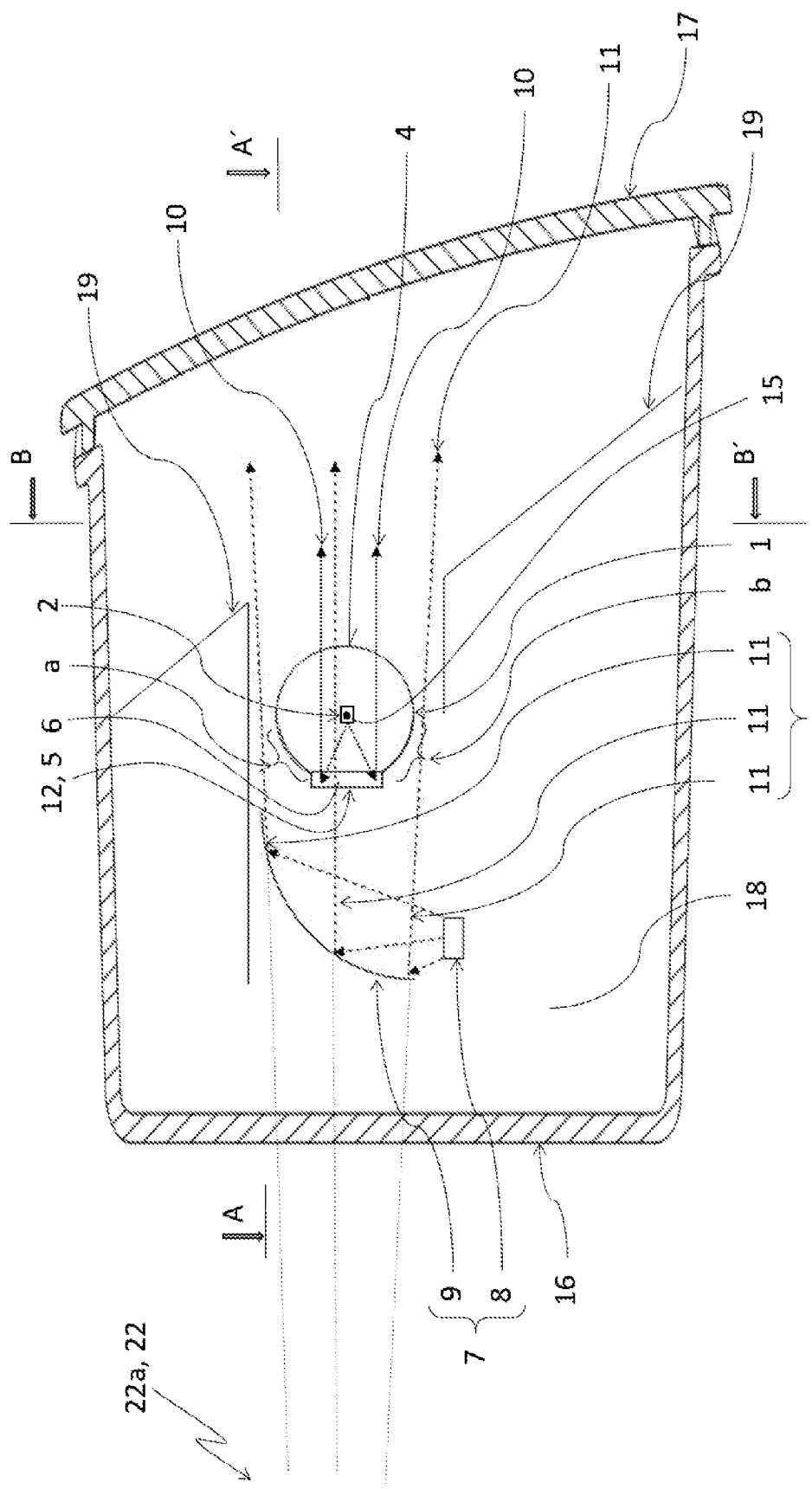

(51) Int. Cl.
*F21S 43/27* (2018.01)
*B60Q 1/00* (2006.01)
*B60Q 1/26* (2006.01)
*F21S 43/30* (2018.01)
*F21Y 115/10* (2016.01)

(52) U.S. Cl.
CPC ............... *F21S 43/27* (2018.01); *F21S 43/30* (2018.01); *G02B 6/0073* (2013.01); *F21Y 2115/10* (2016.08)

(56) References Cited

U.S. PATENT DOCUMENTS

2010/0008088 A1 1/2010 Koizumi et al.
2013/0127612 A1 5/2013 Stadler et al.

LIGHT DEVICE WITH A ROD-LIKE LIGHT GUIDE FOR A MOTOR VEHICLE

RELATED APPLICATIONS

This application claims the priority benefit of Czech Patent Application Serial No. PV 2018-147, filed Mar. 23, 2018, the entire disclosure of which is incorporated herein by reference.

FIELD OF THE INVENTION

The invention relates to a light device for a motor vehicle and it especially relates to a signal lamp fitted with an array of reflectors and a light guide to ensure the required light functions.

BACKGROUND INFORMATION

A lamp for motor vehicles, contains multiple lighting units wherein each of these lighting units provides a different light function or contributes to ensuring the required emission characteristic of the light trace. Individual lighting units are generally mounted in a shaped carrying bushing of the lamp while each unit contains at least one light source and other optical elements. The light source of the light unit emits light rays and the optical elements represent a system of refractive and reflective surfaces and interfaces of optical environments that influence the direction of light rays within the creation of the output light trace.

The documents U.S. Pat. No. 6,966,675B2 and US20010026457A1 disclose designs of headlights whose optical system comprises an assembly of elliptic and parabolic reflectors wherein light is sent directly from the light source to the primary elliptical reflector and from the primary reflector, light is sent indirectly to the secondary parabolic reflector. This way, light rays generated by the light source can be first routed in one direction and subsequently in another direction. A disadvantage of the above-mentioned solutions is the fact that at present, signal lamps of motor vehicles are subject to the requirement that the emitted light beams should produce various light patterns that fulfil a certain stylistic function. For instance a reflector array does not make it possible to produce an output beam of light rays shaped into a certain stylistic line as in the case of using a linear light guide. The above-mentioned solutions are not adapted to provide more different light functions either, especially a combination of a positional light, daytime running light and the light of a directional indicator while there is a trend of using dynamic, gradual lighting up of a directional indicator as indicated, e.g. in the document US20130127612A1.

The document DE102013104176A1 discloses an embodiment of a light device comprising a longitudinally oriented linear light guide whose at least one end is adapted to bind primary light rays from the primary light source and whose surface comprises the front output surface for the output of primary light rays. At the rear side of the light guide, an unbinding surface is situated that is fitted with unbinding elements to direct primary light rays passing through the light guide to the output surface. The light device further comprises at least one reflector unit comprises a secondary light source and a reflector adapted to reflect secondary light rays emitted from the secondary light source towards the rear side of the light guide. In the propagation direction of the light rays, before the light guide, a screen is arranged to produce the required shape of the beam of light rays so that the beam of secondary light rays is only sent to a part of the rear side of the light guide. A disadvantage of this design is the fact that using the screen reduces efficiency of the light rays wherein a part of the emitted rays remains unused as it is caught by the screen.

The object of the invention is to propose a light device for a motor vehicle comprising an array of reflectors to direct secondary light rays to the light guide adapted to conduct primary light rays while the light device must meet various designer requirements for the output light beam of multiple light functions and at the same time, high light efficiency of the optical system must be ensured.

SUMMARY OF THE INVENTION

The above-mentioned objects of the invention are met by a light device for a motor vehicle according to the invention, comprising a rod-like light guide having a longitudinal axis connecting two ends of the light guide, a primary light source positioned on at least one of the ends of the light guide for emitting primary light rays in the light guide, wherein the light guide comprises a front output surface for the output of the primary light rays and at a rear side of the light guide unbinding elements to direct the primary light rays propagating along the light guide to the output surface. The light device further comprises at least one reflector unit comprising a secondary light source for emitting secondary light rays and a reflector adapted to reflect and direct the secondary light rays in the form of a light stream to the light guide, wherein in the lateral cross-section the light stream has a shape of a band having a longitudinal axis being substantially parallel to the longitudinal axis of the light guide, and the rear side of the light guide comprises a binding area including binding surfaces configured to bind the secondary light rays to the light guide.

In a cross-section taken along the vertical plane that is approximately perpendicular to the longitudinal axis of the light guide and passes through the secondary light source, the reflector preferably has an approximately elliptical shape, wherein the secondary light source is situated at the subject focal point.

In a cross-section taken along the horizontal plane, the reflector preferably has a substantially parabolic shape at the focal point of which the secondary light source is situated.

In one of preferred embodiments, the reflector is configured for the incidence of a part of the light stream of secondary light rays on the binding area and the remaining part or parts of the light stream outside the binding area on at least one of the marginal parts of the rear side of the light guide.

In another one of preferred embodiments, the reflector is configured for the incidence of a part of the light stream of the secondary light rays on the rear side of the light guide, the remaining part or parts of the light stream passing by the light guide.

In another one of preferred embodiments, the reflector is configured to concentrate the light stream of secondary light rays and to ensure that substantially an entire light stream falls on the binding area of the light guide. The reflector is preferably configured to concentrate the light stream of light rays in such a way that the light stream produces a narrow band image in the binding area.

The unbinding elements are preferably situated in the binding area, the binding area comprising binding surfaces. The unbinding elements are preferably situated in the binding area, forming with the binding surfaces a regular alternating pattern.

In another one of preferred embodiments, the reflector comprises mutually connected reflective surfaces, the individual reflective surfaces having in a cross-section taken along the vertical plane approximately perpendicular to the longitudinal axis of the light guide an approximately elliptic shape, and in a cross-section taken along the horizontal plane an approximately parabolic shape, the focal points of individual parabolas being situated at a common point where the secondary light source is found.

The light device preferably comprises multiple separate reflector units arranged next to each other.

The system of the light guide and primary light source is preferably adapted to provide one light function and the system of the light guide and reflector unit or units is adapted to provide another light function of the light device.

In one of preferred embodiments, the secondary light sources of the reflector units are sequentially switched on and off to provide the function of a progressive directional indicator.

The primary light source and the secondary light source are preferably LED sources.

CLARIFICATION OF DRAWINGS

Figure 1B:
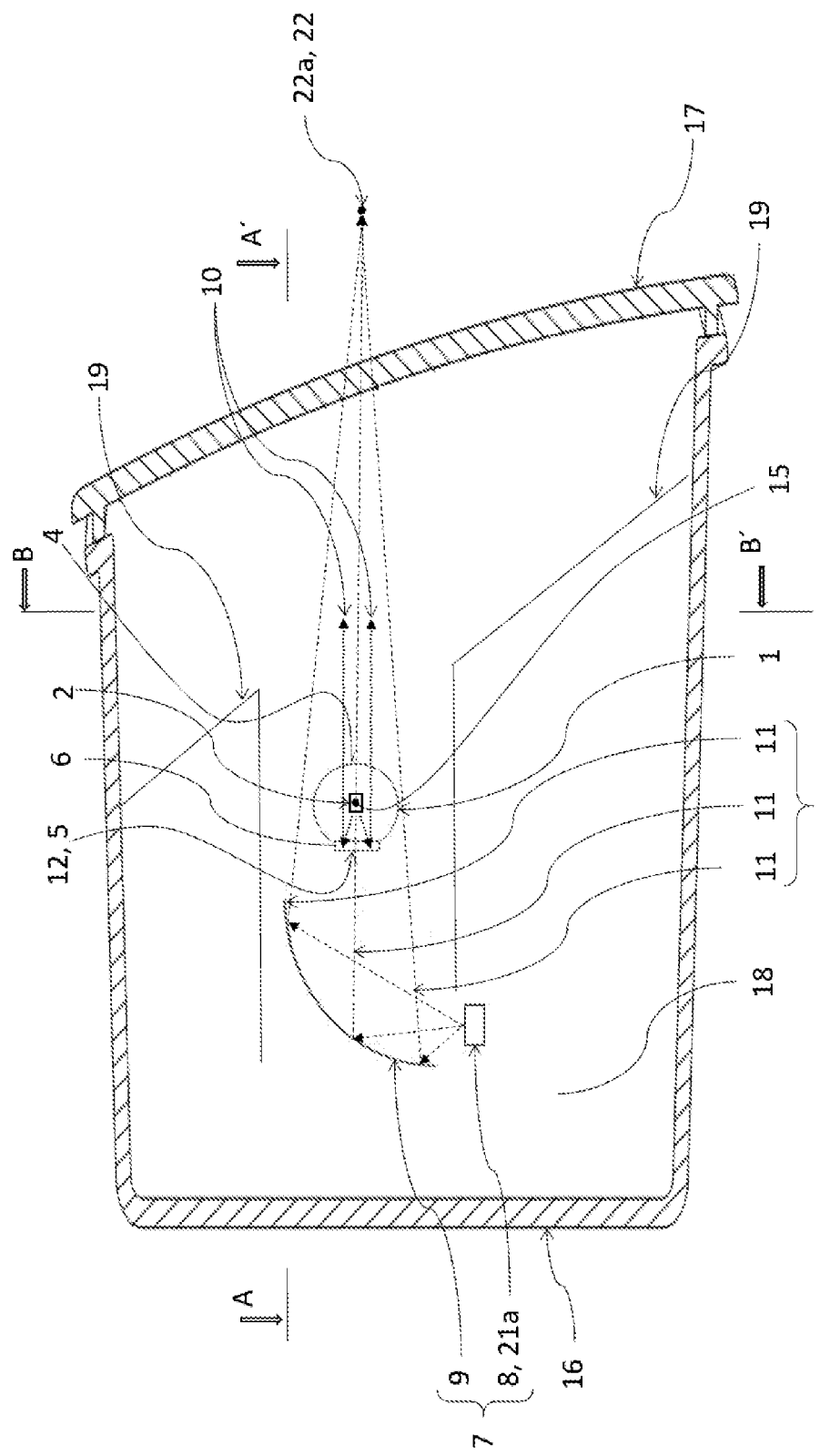
Figure 2:
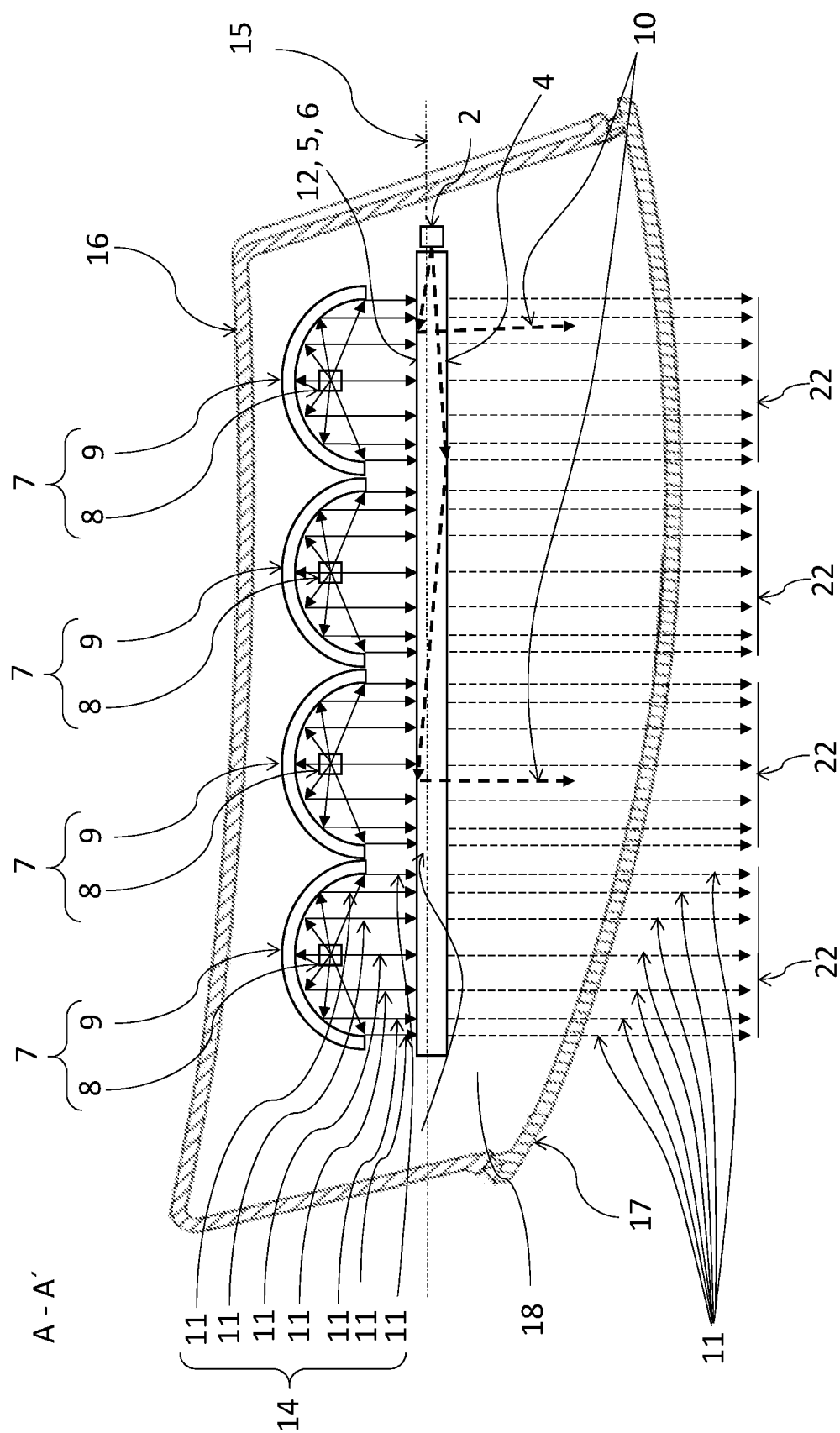
Figure 3:
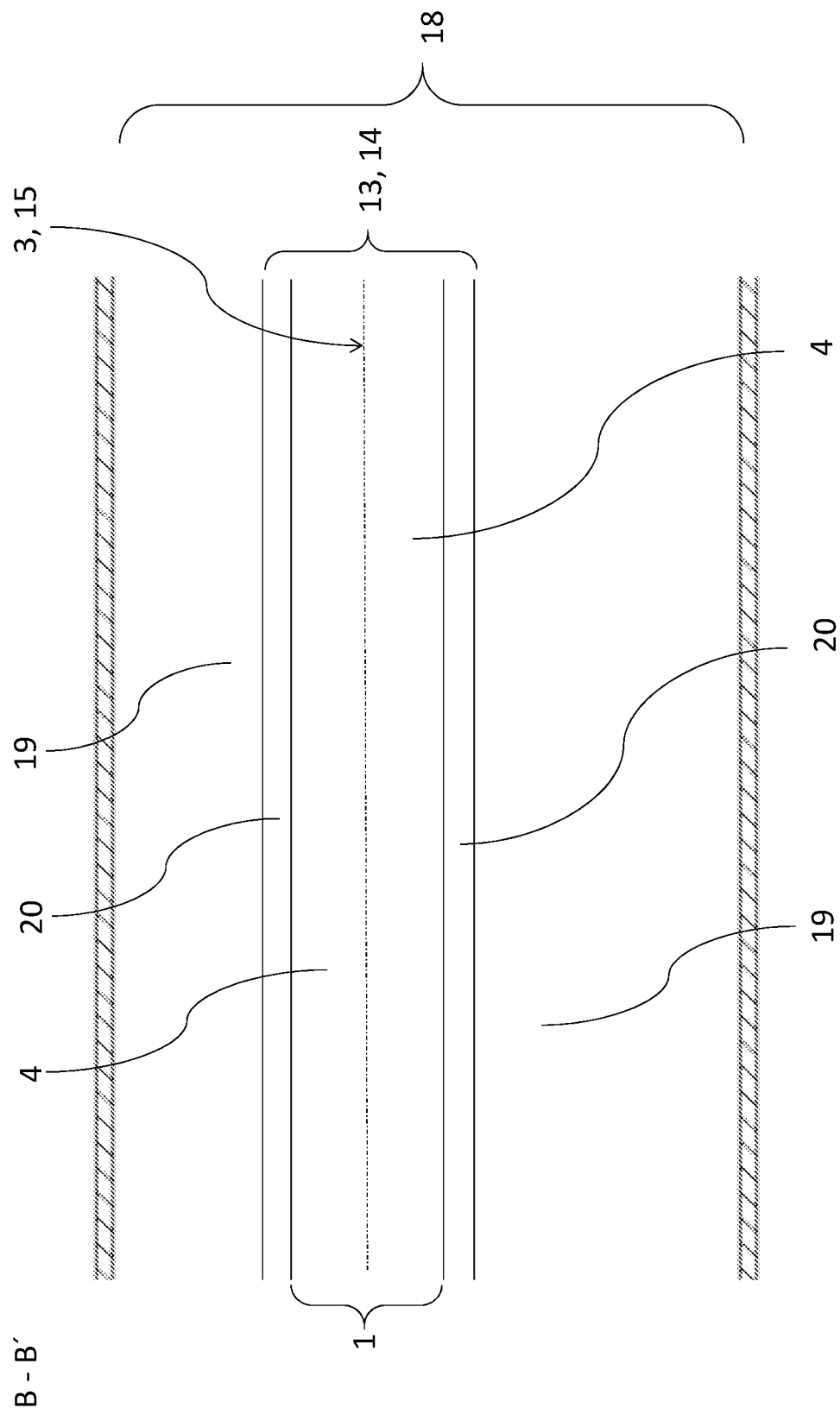
Figure 4:
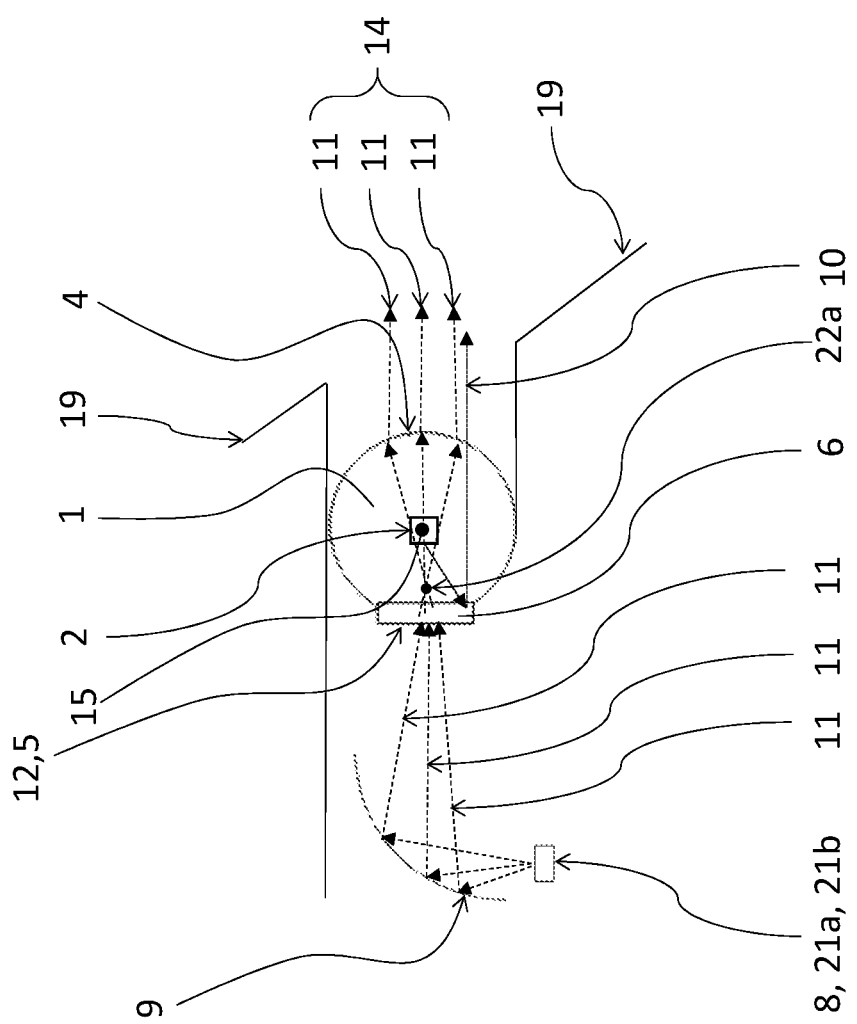
Figure 5:
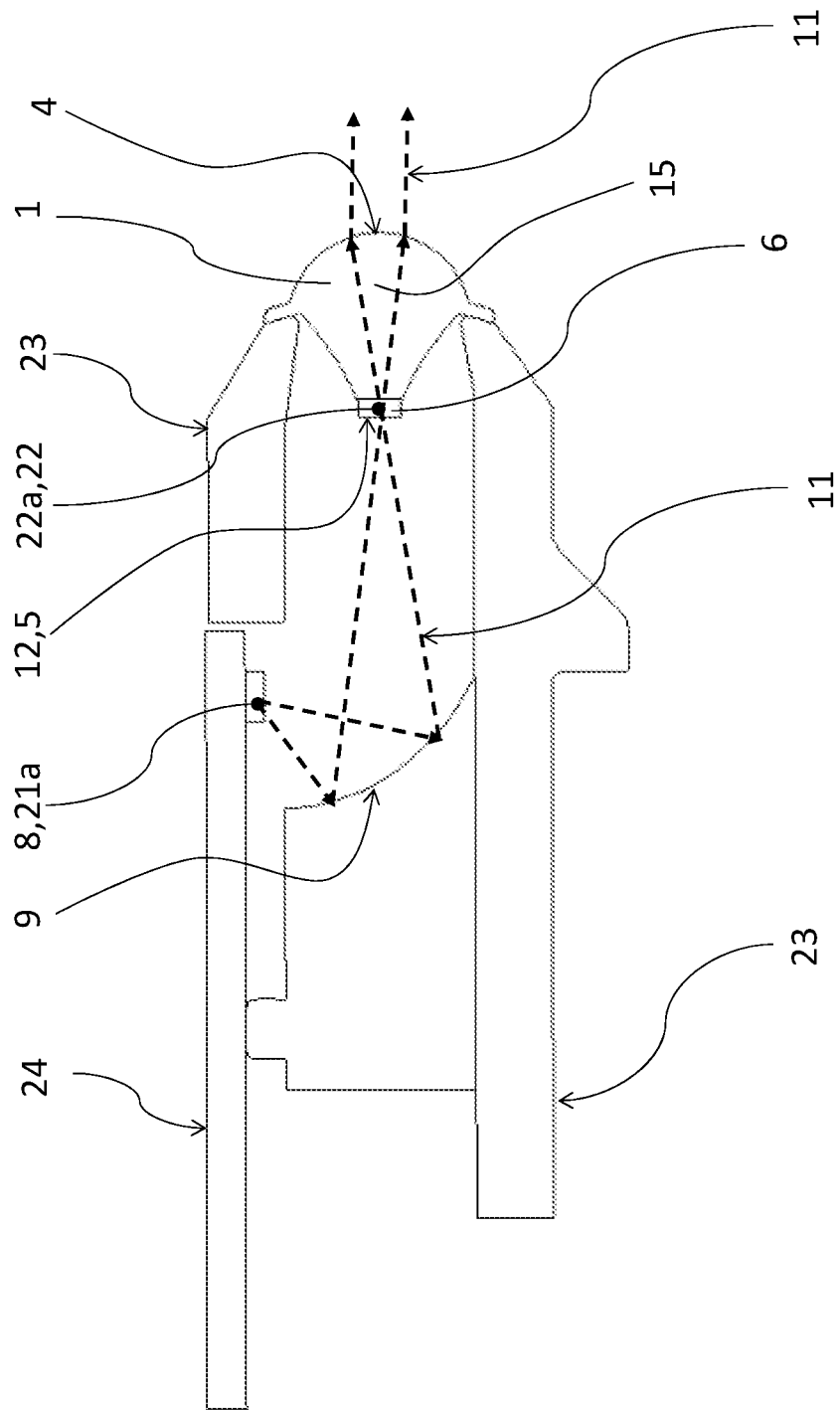
Figure 6:
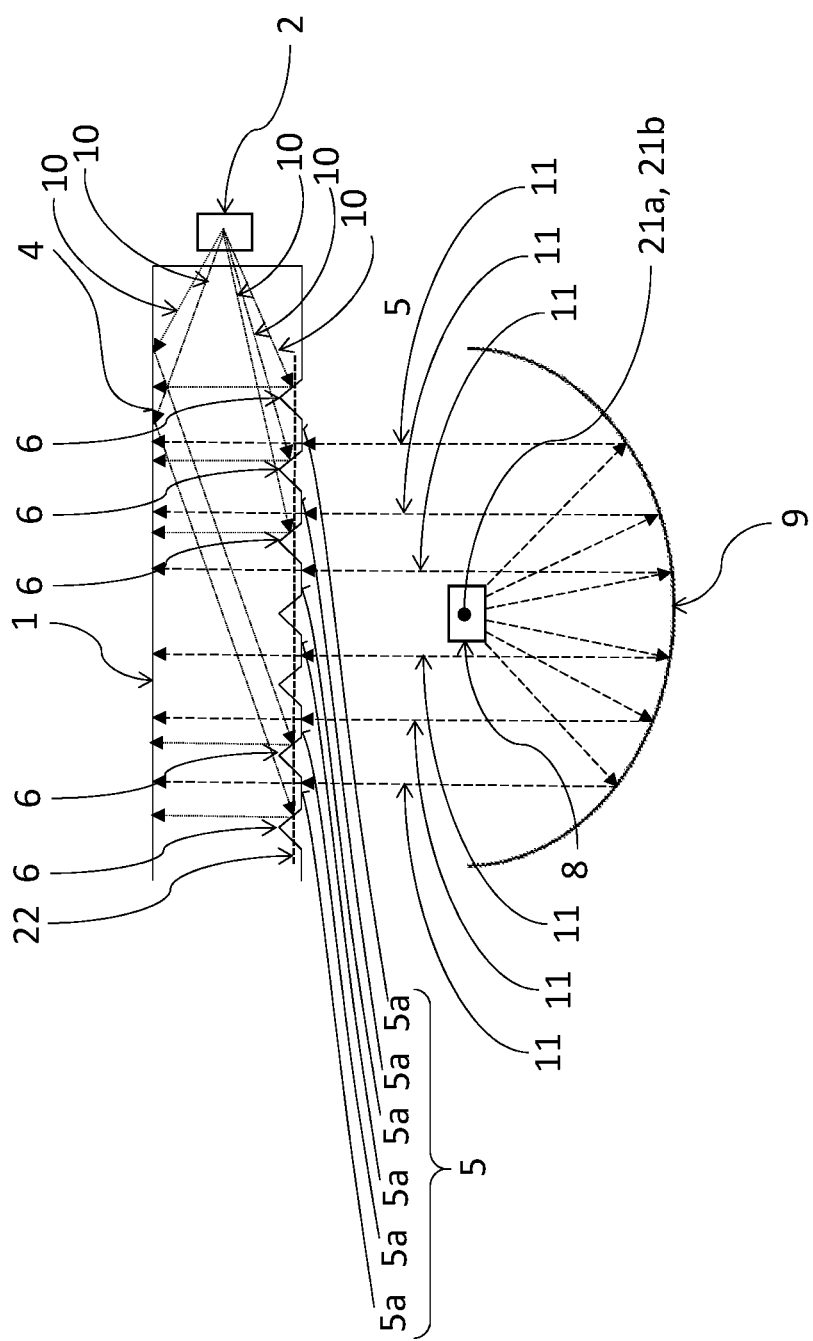
Figure 7:
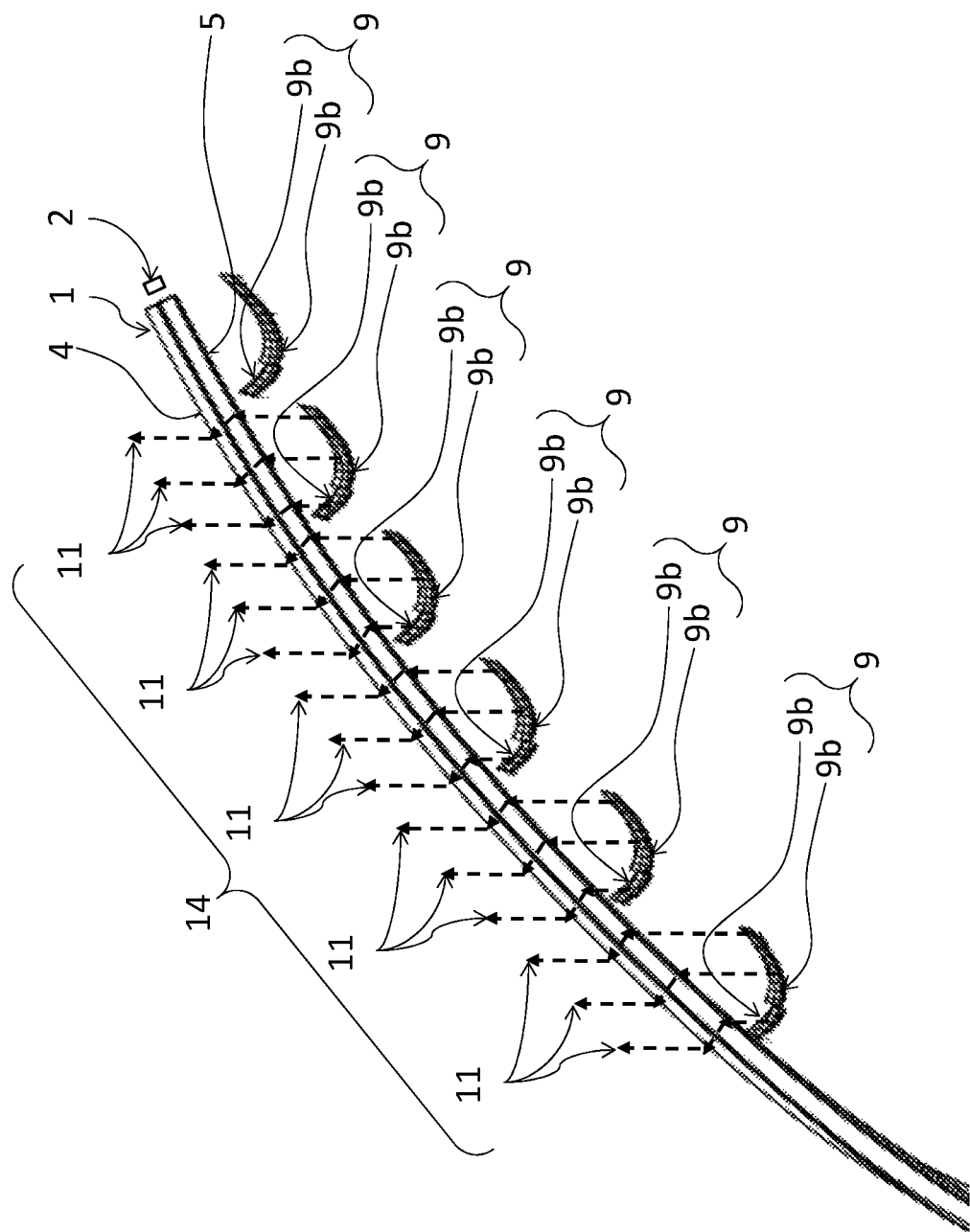

The invention will be clarified in a more detailed way with the use of its embodiment examples with references to attached drawings, where:

FIG. 1A shows the first exemplary embodiment of the light device in accordance with the invention in a vertical cross-section, FIG. 1B shows the second exemplary embodiment of the light device in accordance with the invention in a vertical cross-section, FIG. 2 shows the horizontal cross-section A-A of FIGS. 1A and 1B, FIG. 3 shows the vertical cross-section B-B of FIGS. 1A and 1B, FIG. 4 shows the third exemplary embodiment of the light device in accordance with the invention in a vertical cross-section, FIG. 5 shows the fourth exemplary embodiment of the light device in accordance with the invention in a vertical cross-section, FIG. 6 shows a horizontal cross-section of the embodiment of FIG. 5, and FIG. 7 shows a horizontal cross-section through the fifth embodiment example of the light device according to the invention.

EXAMPLES OF EMBODIMENTS OF THE INVENTION

FIG. 1A shows the first exemplary embodiment of the light device, in the particular case it is a signal lamp according to the invention, in a cross-section along the vertical plane passing through the secondary light source 8, and approximately perpendicular to the longitudinal axis 15 of the light guide 1. As shown in FIG. 1, the light device comprises a carrier housing 16 covered by a transparent cover 17. In the inner space 18 of the carrier housing 1, a reflector unit 7, light guide 1 and covering mask 19 are situated. The purpose of using the covering mask 19 and its exclusive function is to cover parts of the light device situated behind this covering mask 19 in the front view of the lamp. The light guide 1 of a circular/mushroom-like profile is adapted to bind (couple) primary light rays 10 generated by the primary light source 2. The primary light rays 10 bound in the light guide 1 propagates along the light guide 1 due to total reflection from the surface of the light guide 1 until they are unbound (uncoupled) by the unbinding elements 6 from the light guide 1 by passing through an output surface 4. The reflector unit 7 comprises a secondary light source 8 and a reflector 9 to reflect secondary light rays 11 emitted from the secondary light source 8 towards the rear side 12 of the light guide 1.

The rear side 12 of the light guide 1 comprises a binding area 5 to bind secondary light rays 11 to the inner structure of the light guide 1. The secondary light rays 11 that are coupled in the light guide 1 then proceed to the output surface 4 and through the output surface 4 they leave the light guide 1. The unbinding elements 6 are situated in the binding area 5 to direct primary light rays 10 that pass from the primary light source 2 along the light guide 1 to the front output surface 4 of the light guide 1.

Apart from the binding area 5, the rear side 12 of the light guide 1 comprises also marginal (edge) parts a and b shown in FIG. 1A.

The reflector 9 is configured to reflect the secondary light rays 11 so that a part of the light stream 14 of the secondary light rays 11 falls on the binding area 5, another part of the light stream 14 falls on the rear side 12 outside the binding area 5 i.e. on the marginal parts a and b, and the remaining parts of the light stream 14 pass by the light guide 1 at the top and at the bottom. Importantly, the reflector 9 is configured in such a way that the said remaining parts of the light stream 14 that pass by the light guide 1 at the bottom and at the top are directed by the reflector 9 to the top and bottom gaps between the light guide 1 and the covering mask 19 in such a way that these parts of the light stream 14 are not screened or redirected by the covering mask 19 in any way. As mentioned above, the exclusive function of the covering mask 19 is to cover the parts of the light device situated behind this covering mask 19 in the front view of the lamp, i.e. the covering mask 19 does not serve as a screen for the secondary light rays 11. The secondary light rays 11 enter the light guide through the binding area 5, and some of the light rays 11 can also enter the light guide 1 through the marginal parts a and b, depending on their angle of incidence. In addition, the light guide surface in the marginal parts a and b can be either without any coupling elements or it can be provided with coupling elements configured to enhance coupling of the secondary light rays 11 falling on the marginal parts a and b in the light guide 1.

In its vertical cross-section shown in FIG. 1A, the reflector 9 has a shape that produces a divergent beam of the secondary light rays 11 after reflection, with the virtual image focal point 22a situated behind the carrier housing 16.

By contrast, the second exemplary embodiment of the invention, which is shown in FIG. 1B, only differs from the embodiment of FIG. 1A that the reflector is configured in such a way that in the vertical cross-section shown in FIG. 1B, it produces a convergent beam of secondary light rays 11 that intersect in the image focal point 22a.

FIG. 2 shows the horizontal cross-section A-A of the second exemplary embodiment of the invention whose vertical cross-section is shown in FIG. 1B. Although FIG. 2 shows four reflectors 9 arranged next to each other, one or more reflectors 9 can be generally used. The image focal points 22a of each of the reflectors 9 produce a focal line 22 that is situated before the transparent cover 17 in this particular embodiment.

The said first exemplary embodiment of the invention, whose vertical cross-section is shown in FIG. 1a has a horizontal cross-section corresponding to the representation of FIG. 2 (the number of reflectors is one or more again) except that the focal line 22 is situated behind the carrier housing 16 as indicated in FIG. 1A.

Since in line with FIG. 2, it is desirable for the focal lines to be adjacent to each other without larger gaps in the first as well as second embodiment, the reflectors 9 have an approximately parabolic shape on the horizontal plane to make the secondary light rays 11 reflected from each of the reflectors 9 mutually approximately parallel.

Thus, the spatial shape of the reflector 9 is a merger of an elliptic and parabolic shape wherein on the horizontal plane, the shape is approximately parabolic and on the vertical plane, the shape is approximately elliptic. Thus, the reflector 9 is referred to as an elliptic-parabolic one.

In the embodiment shown in FIG. 1B, the reflector 9 has an elliptic-parabolic shape, wherein in the vertical cross-section it essentially has the shape of an ellipse and in the horizontal direction the shape of a parabola. The secondary light source 8 is situated at the subject focal point 21a of the ellipse and the image focal point 22a of the ellipse is only situated after the light guide 1 in the propagation direction of the secondary light rays 11. Parts of the light stream 14 pass by the light guide 1 and the remaining part of the light stream 14 falls on the light guide 1.

FIG. 2 indicates that the light guide 1 is of an elongated shape with a longitudinal axis 15 at the front of which the primary light source 2 is situated. The front of the light guide 1 is designed to bind the primary light rays 10 from the primary light source 2. At the rear side 12 of the light guide 1, the shell (surface) of the light guide 1 comprises a binding area 5 including binding surfaces 5a and unbinding elements 6 (they may be designed e.g. in the form of a toothed structure as shown on FIG. 6), arranged alternately next to each other. The binding surfaces 5a bind the secondary light rays 11 in the light guide 1, whereas the unbinding elements 6 direct the primary light rays 10 that have fallen onto the unbinding elements 6 to the output surface 4 so that the primary light rays 10 fall on the output surface 4 at an angle of incidence that is smaller than a critical angle, thus enabling unbinding the primary light rays 10 from the light guide 1. The light device further preferably comprises an array of reflector units 7 arranged next to each other. Each reflector unit 7 is configured in such a way that the light stream 14 of secondary light rays 11 passes from the reflector 9 to the light guide 1 without the said light stream 14 being trimmed by a screen or covering mask 19 along the route between the reflector 9 and the light guide 1.

The terms "vertical" and "horizontal" used in this disclosure and claims are based on the orientation of the light device shown in the FIGS. 1 and 6 and may not correspond to the orientation that the light device is arranged in during operation in a vehicle.

FIG. 3 shows the vertical cross-section B-B indicated in FIGS. 1A and 1B, i.e. it is a view of the first and second exemplary embodiment in the said cross-section. As shown, a part of the light stream 14 exits through the output surface 4 of the light guide 1 and the remaining marginal parts 20 of the light stream 14 pass by the light guide 1, and in the front view, the light stream 14 has the shape of a band 13 whose longitudinal axis 3 is essentially parallel or even identical (in case of a symmetrical arrangement) to the longitudinal axis 15 of the light guide 1.

FIG. 4 shows the third exemplary embodiment of the signal lamp in a cross-section taken along the vertical plane passing through the secondary light source 8 and approximately perpendicular to the longitudinal axis 15 of the light guide wherein the reflector 9 has an approximately elliptic shape in the vertical cross-section shown while in the horizontal cross-section it has an approximately parabolic shape. The secondary light source 8 is situated at the subject focal point 21a of the ellipse, which is the focal point 21b of the parabola at the same time. The image focal point 22a is situated near the light guide 1 to concentrate the light stream 14 of the secondary light rays 11 and to ensure incidence of essentially the whole light stream 14 on the binding area 5 of the light guide 1.

FIG. 5 shows the fourth exemplary embodiment of the invention in a cross-section taken along the vertical plane passing through the secondary light source 8, and approximately perpendicular to the longitudinal axis 15 of the light guide. In this cross-section, the shown curve of the reflector 9 has an elliptic shape, the secondary light source 8 being situated at the subject focal point 21a and the image focal point 22a being situated near the unbinding elements 6. If multiple reflectors 9 are arranged next to each other, their image focal points 22a are situated along a focal line (generally a curve, which may also be a straight line) 22 (see FIG. 6). The secondary light sources 8 are arranged on at least one carrier 24, e.g., on a PCB, and the light guide 1 is fixed in the required location by means of at least one holder 23.

FIG. 6 shows a horizontal cross-section of the embodiment shown in FIG. 5, wherein, for the sake of clarity, the projection of the secondary light source 8 has been added to the drawing, which secondary light source 8 is actually situated above the plane shown in FIG. 6. The curve of the reflector 9 has a parabolic shape on the horizontal plane and the secondary light source 8 projection is situated approximately at the focal point 21b of the parabola and the secondary light rays 11 reflected from the reflector 9 are directed essentially mutually parallel in the direction towards the focal line 22 (see the description of FIG. 5 above). The rear side 12 of the light guide 1 comprises the binding area 5 including binding surfaces 5a and the unbinding elements 6 that are arranged alternately with the binding surfaces 5a. The binding surfaces 5a are designed to bind the secondary light rays 11 falling on them into the light guide 1 and the unbinding elements 6 are designed to direct the primary light rays 10 that have already been bound from the primary light source 2 to the light guide 1 and fallen on the unbinding elements 6 during their passage along the light guide 1 to the output surface 4 so that they can exit from the light guide 1 through its output surface 4. A part of the secondary light rays 11 reflected from the reflector 9 may also fall on the unbinding elements 6 in which case these secondary light rays 11 are not bound to the light guide 1.

FIG. 7 shows a horizontal cross-section through the fifth exemplary embodiment of the light device according to the invention wherein the reflectors 9 consist of mutually connected reflective surfaces 9b. Individual reflective surfaces 9b have an elliptic shape in a vertical cross-section and a parabolic shape in a horizontal cross-section, wherein at the not shown focal points 21a, 21b of each reflective surface 9b a not shown secondary light source 8 is situated. The reflective surfaces 9b are configured for the incidence of at least a part of the light stream 14 of the light rays 11 on the binding area 5 of the light guide 1. The binding area 5 and the output surface 4 is refractive and thus a certain light refraction occurs due to passage through the binding area 5 and the output surface 4, therefore the secondary light rays 11 enter or exit the inside of the light guide 1 at a different angle from an angle at which they fall from the outside or the inside on the surface (shell) of the light guide 1, respectively.

In one of preferred embodiments, the system of the light guide 1 and the primary light source 2 is adapted to provide a first light function and the system of the light guide 1 and the reflector units 7 is adapted to provide a second function of the light device, the primary light source 2 and/or the secondary light sources 8 being preferably implemented as LED sources. For instance, a daytime running light function or a positional light function of a white color can be performed by means of primary light rays 10 emitted from the primary light source 2, conducted along the inner structure of the light guide 1 and further directed to the output surface 4, and a second light function of a directional indicator of a yellow color can be provided by means of secondary light rays 11 emitted from the secondary light source 8 towards the reflector 7 and subsequently reflected towards the light guide 1, wherein the individual secondary light sources 8 of the reflector units 7 can be sequentially switched on and off to provide the function of a progressive directional indicator.

As it is obvious from the above-described embodiments and the scope of protection defined by the attached claim 1, the invention envisages various embodiments, e.g., embodiments wherein the light stream 14 of the secondary light rays 11 is entirely concentrated in the region of the binding area 5, embodiments wherein a part of the light stream 14 falls onto the binding area 5 whereas the remaining part of this light stream 14 falls outside the binding area 5 on the rear side 12 of the light guide—so it falls on at least one of the marginal parts a, b, as well as embodiments wherein a part of the light stream 14 falls on the binding area 5, another part of the light stream 14 falls on at least one of the marginal parts a, b of the rear side 12 of the light guide 1 and the remaining part of the light stream 14 passes over and/or under the light guide 1.

The above-described embodiments comprise a binding area 5 that includes binding surfaces 5a and unbinding elements 6 designed e.g. as surface areas of prism parts, wherein the binding surfaces 5a regularly or irregularly alternate with intermediate unbinding elements 6. Other embodiments are also possible as long as they allow at least a part of the light stream 14 to be bound into the light guide 1 through its rear side 12 and at the same time ensure propagation of the primary light rays 10 along the light guide 1 by means of total reflection and on their incidence on the unbinding elements 6 their reflection towards the output surface 4 of the light guide 1 at an angle at which they pass through the output surface 4 out of the light guide 1.

The present invention is not limited to the above-described examples of its embodiments, but it also comprises all modifications and changes falling within the scope defined by the attached patent claims.

LIST OF REFERENCE MARKS

1—light guide
2—primary light source
3—longitudinal axis
4—output surface
5—binding area
5a—binding surface
6—unbinding element
7—reflector unit
8—secondary light source
9—reflector
9b—reflective surface
10—primary light ray
11—secondary light ray
12—rear side
13—band
14—light stream
15—longitudinal axis of the light guide
16—carrier housing
17—transparent cover
18—inner space
19—covering mask
20—marginal part (of the light stream 14)
21a, 21b, 22a—focus
22—focal line
23—holder
24—carrier
a, b—marginal part

The invention claimed is:

1. A light device for a motor vehicle, comprising a rod-like light guide having a longitudinal axis connecting two ends of the light guide, a primary light source positioned on at least one of the ends of the light guide for emitting primary light rays in the light guide, wherein the light guide comprises a front output surface for the output of the primary light rays and at a rear side of the light guide unbinding elements to direct the primary light rays propagating along the light guide to the front output surface, wherein the light device further comprises at least one reflector unit comprising a secondary light source for emitting secondary light rays and a reflector adapted to reflect and direct the secondary light rays in the form of a light stream to the light guide, wherein in a lateral cross-section the light stream has a shape of a band having a longitudinal axis being substantially parallel to the longitudinal axis of the light guide, and the rear side of the light guide comprises a binding area including binding surfaces configured to bind the secondary light rays to the light guide.

2. The light device according to claim 1, wherein, in a cross-section along a vertical plane that is approximately perpendicular to the longitudinal axis of the light guide and passes through the secondary light source, the reflector has approximately an elliptical shape, wherein the secondary light source is situated at a subject focal point.

3. The light device according to claim 1, wherein, in a cross-section taken along a horizontal plane, the reflector has approximately a parabolic shape, wherein a projection of the secondary light source into the horizontal plane is situated approximately at a focal point of the parabolic shape.

4. The light device according to claim 1, wherein the reflector is configured such that a part of the light stream of secondary light rays falls on the binding area and the remaining part of the light stream falls outside the binding area on at least one of marginal parts of the rear side of the light guide.

5. The light device according to claim 1, wherein the reflector is configured such that a part of the light stream of the secondary light rays falls on the rear side of the light guide, wherein the remaining part or parts of the light stream pass by the light guide.

6. The light device according to claim 1, wherein the reflector is configured such that the light stream of the secondary light rays is concentrated and falls substantially in its entirety on the binding area of the light guide.

7. The light device according to claim 6, wherein the reflector is configured to concentrate the light stream of the secondary light rays so that substantially the entire light stream falls on the binding area in the form of a narrow band.

8. The light device according to claim 1, wherein the unbinding elements are situated in the binding area.

9. The light device according to claim 8, wherein the unbinding elements are situated between binding surfaces in such a way that the unbinding elements regularly alternate with the binding surfaces.

10. The light device according to claim 1, wherein the reflector includes mutually connected reflective surfaces, the individual reflective surfaces having (i) an approximately elliptic shape in a cross-section taken along a vertical plane approximately perpendicular to the longitudinal axis of the light guide and (ii) an approximately parabolic shape in a cross-section taken along a horizontal plane, the focal points of individual parabolas being situated at a common point where the secondary light source is found.

11. The light device according to claim 1, wherein a system of the light guide and the primary light source is adapted to provide a first light function and the system of the light guide and the reflector unit is adapted to provide a second light function of the light device.

12. The light device according to claim 1, wherein the light device comprises multiple separate reflector units arranged next to each other.

13. The light device according to claim 12, wherein the secondary light sources of the reflector units are configured to be sequentially switched on and off to provide the function of a progressive directional indicator.

14. The light device according to claim 1, wherein the primary light source and the secondary light source are LED sources.

\* \* \* \* \*